(12) United States Patent
Cence et al.

(10) Patent No.: US 12,405,250 B2
(45) Date of Patent: Sep. 2, 2025

(54) METHOD FOR MONITORING THE CHANGE OVER TIME OF A DEFECT IN A STRUCTURE

(71) Applicants: L'AIR LIQUIDE SOCIETE ANONYME POUR L'ETUDE ET L'EXPLOITATION DES PROCEDES GEORGES CLAUDE, Paris (FR); EKOSCAN, Saint Remy (FR)

(72) Inventors: Hugo Cence, Saint Remy (FR); Valentin Perret, Saint Remy (FR); Olivier Bardoux, Les Loges-en Josas (FR); Daniel Gary, Les Loges-en Josas (FR); Sophie Wastiaux, Champigny-sur-Marne (FR)

(73) Assignees: L'AIR LIQUIDE SOCIETE ANONYME POUR L'ETUDE ET L'EXPLOITATION DES PROCEDES GEORGES CLAUDE, Paris (FR); EKOSCAN, Saint Remy (FR)

( * ) Notice: Subject to any disclaimer, the term of this patent is extended or adjusted under 35 U.S.C. 154(b) by 594 days.

(21) Appl. No.: 17/792,313
(22) PCT Filed: Dec. 24, 2020
(86) PCT No.: PCT/EP2020/087864
§ 371 (c)(1),
(2) Date: Jul. 12, 2022
(87) PCT Pub. No.: WO2021/144134
PCT Pub. Date: Jul. 22, 2021

(65) Prior Publication Data
US 2023/0059369 A1 Feb. 23, 2023

(30) Foreign Application Priority Data
Jan. 17, 2020 (FR) ...................................... 2000483

(51) Int. Cl.
*G01N 29/06* (2006.01)
*G01N 29/04* (2006.01)
(Continued)

(52) U.S. Cl.
CPC ............ *G01N 29/06* (2013.01); *G01N 29/041* (2013.01); *G01N 29/043* (2013.01); *G01N 29/07* (2013.01);
(Continued)

(58) Field of Classification Search
CPC .... G01N 29/06; G01N 29/041; G01N 29/043; G01N 29/07; G01N 29/28;
(Continued)

(56) References Cited

U.S. PATENT DOCUMENTS 5,195,046 A * 3/1993 Gerardi .................. B64D 15/20
73/659
6,848,313 B2 * 2/2005 Krieg .................. G01N 29/2456
73/624

(Continued)

FOREIGN PATENT DOCUMENTS

CA           2901547 A1 *  2/2017
JP         2013-002822 A    1/2013
(Continued)

OTHER PUBLICATIONS

International Search Report as issued in International Patent Application No. PCT/EP2020/087864, dated Mar. 19, 2021.

(Continued)

*Primary Examiner* — Jacques M Saint Surin
(74) *Attorney, Agent, or Firm* — Pillsbury Winthrop Shaw Pittman LLP (57) ABSTRACT

A method of monitoring a portion of an equipment under pressure implementing a control station to control an ultrasonic non-destructive testing device through a remote network, includes: the control station sends a first measurement request to the non-destructive testing device; the control station receives a first plurality of measurement data from the non-destructive testing device, constructs a first mapping (Continued)

of the portion of the structure from the data; sends a second measurement request to the non-destructive testing device, receives a second plurality of measurement data from the non-destructive testing device, constructs a second mapping of the portion of the structure, from the second plurality of measurement data, and compares the first mapping and the second mapping.

15 Claims, 3 Drawing Sheets

(51) Int. Cl.
    *G01N 29/07*    (2006.01)
    *G01N 29/28*    (2006.01)

(52) U.S. Cl.
    CPC ..... *G01N 29/28* (2013.01); *G01N 2291/0289* (2013.01); *G01N 2291/263* (2013.01)

(58) Field of Classification Search
    CPC ......... G01N 29/2481; G01N 2291/044; G01N 2291/106; G01N 2291/263; G01N 2291/0289; G06Q 50/10
    USPC .......................................................... 73/627
    See application file for complete search history.

(56) References Cited

U.S. PATENT DOCUMENTS

| | | | | |
|---|---|---|---|---|
| 6,922,641 | B2 * | 7/2005 | Batzinger | ............. G01B 7/281 |
| | | | | 702/35 |
| 7,302,866 | B1 | 12/2007 | Malkin et al. | |
| 8,042,399 | B2 * | 10/2011 | Pasquali | ............... B06B 1/0622 |
| | | | | 73/622 |
| 9,217,999 | B2 * | 12/2015 | Domke | .............. G05B 23/0208 |
| 9,537,907 | B2 * | 1/2017 | Messinger | ............ H04L 65/403 |
| 9,588,085 | B2 * | 3/2017 | Scaccabarozzi | ... G01N 29/4445 |
| 11,170,489 | B2 * | 11/2021 | Pyznar | .................... G06F 30/13 |
| 2009/0192727 | A1 | 7/2009 | Ford | |
| 2009/0217761 | A1 | 9/2009 | Qing et al. | |

FOREIGN PATENT DOCUMENTS

| | | |
|---|---|---|
| JP | 2015-225043 A | 12/2015 |
| KR | 20160137243 | * 11/2016 |

OTHER PUBLICATIONS

Office Action as issued in Singapore Application No. 11202251279G, dated Jun. 6, 2025.

* cited by examiner

METHOD FOR MONITORING THE CHANGE OVER TIME OF A DEFECT IN A STRUCTURE

CROSS-REFERENCE TO RELATED APPLICATIONS

This application is the U.S. National Stage of PCT/EP2020/087864, filed Dec. 24, 2020, which in turn claims priority to French patent application number 2000483 filed Jan. 17, 2020. The content of these applications are incorporated herein by reference in their entireties.

TECHNICAL FIELD OF THE INVENTION

The technical field of the invention is that of ultrasonic non-destructive testing and in particular testing of the structural integrity of a structure such as pressurised equipment.

TECHNOLOGICAL BACKGROUND OF THE INVENTION

In order to guarantee the safety of a structure in operational condition, such as a pressurised container, structural integrity testing is performed regularly over time. The purpose of these tests is to determine the appearance of a defect or to monitor its change over time. Examples of such defects are cracks created by loading conditions, a porous zone or a zone of corrosion of the structure in contact with active products or delamination between layers of a composite material. In order not to disturb the use of the structure in operational condition, the testing means implemented are of a non-destructive type, such as ultrasonic mapping.

From prior art, a mapping method implementing a portable ultrasonic non-destructive testing device is known, comprising a multi-element ultrasonic sensor, making it possible to perform measurements and analysis of the measurement data on site. This type of device generally includes a user interface, such as a screen, for displaying measurement data or indicators resulting from the analysis of measurement data in real time.

However, this type of portable device requires intervention of an operator on site, in proximity to a structure including a defect, to perform the measurements and processing of the measurement data. The extent of the defect in the structure may be such that the safety of the operator is compromised and this compromise will only be revealed when the operator has mapped the portion comprising the defect and analysed the measurement data.

SUMMARY OF THE INVENTION

The invention provides a solution to the previously discussed problems, by allowing a mapping of a structure in operational condition, to be performed in real time more efficiently and more safely, in order to monitor the change in a defect.

A first aspect of the invention relates to a method for monitoring a portion of a structure using a control station configured to control at least one ultrasonic non-destructive testing device through a remote network, each ultrasonic non-destructive testing device comprising a multi-element ultrasonic sensor disposed on a surface of the portion of the structure, the method comprising, for each ultrasonic non-destructive testing device, the following steps of:

A) the control station sending a first measurement request to the non-destructive testing device;
B) the control station receiving a first plurality of measurement data from the non-destructive testing device, the first plurality of measurement data being measured by the multi-element ultrasonic sensor of the ultrasonic non-destructive testing device;
C) the control station constructing a first mapping of the portion of the structure from the first plurality of measurement data;
D) subsequently to sending the first measurement request, the control station sending a second measurement request to the non-destructive testing device;
E) the control station receiving a second plurality of measurement data from the non-destructive testing device, the second plurality of measurement data being measured by the multi-element ultrasonic sensor of the ultrasonic non-destructive testing device;
F) the control station constructing a second mapping of the portion of the structure, from the second plurality of measurement data; and
G) the control station comparing the first mapping and the second mapping.

Triggering the sending of the first measurement request may be performed on demand by an operator. Furthermore, step A does not include any measurement preparation or preliminary calculations that could postpone sending of the first measurement request to one of the ultrasonic non-destructive testing devices. Thus, the operator obtains at least one first mapping, from step C, without any waiting time other than the time specific to the ultrasonic non-destructive testing device performing the measurements.

The period between obtaining the first and second mappings makes it possible to observe the change over time in a portion of structure, indicated by the second mapping, relative to an initial state, indicated by the first mapping.

By virtue of the implementation of the remote network, the control station, with which the operator interacts to obtain the mappings, is distinct from each ultrasonic non-destructive testing device. Thus, the operator can be located remotely from structures comprising at least one defect and which may present a risk to his/her safety.

Another advantage of the implementation of the remote network is to share the control station among several ultrasonic non-destructive testing devices located at different sites. Thus, the operator can test the change in a plurality of portions of structures, without going to the different sites.

According to one embodiment of the first aspect of the invention, the remote network is wireless.

One advantage of the wireless network is that it is possible to move around while maintaining the connection between the control station and each ultrasonic non-destructive testing device. Thus, the operator can perform a first test, in proximity to the ultrasonic non-destructive testing device in order to determine if the device is well positioned and then move away from the device to perform the other tests.

According to one embodiment of the first aspect of the invention, the first measurement request includes at least one first information selecting a measurement mode.

According to one embodiment of the first aspect of the invention, the first measurement request includes at least one first operating parameter of the measurement mode.

According to one embodiment of the first aspect of the invention, the second measurement request includes at least one second information selecting the measurement mode.

According to one embodiment of the first aspect of the invention, the second measurement request includes at least one second operating parameter of the measurement mode.

The measurement mode describes the course of steps within the ultrasonic non-destructive testing device that result in obtaining measurement data. In some cases, the course of steps requires the provision of operating parameters.

Selecting a measurement mode for obtaining the second plurality of measurement data, which is different from the measurement mode used for obtaining the first plurality of measurement data, makes it possible to adapt the monitoring method to the change in the defect to be monitored.

Moreover, the selection of the measurement mode from the first measurement request or the second measurement request makes it possible to select the measurement mode remotely without the operator having to go to the measurement site.

According to one embodiment of the first aspect of the invention, if at least one parameter representative of the comparison between the first mapping and the second mapping deviates from a threshold value, the method includes a step of triggering an indicator.

One advantage of triggering an indicator relative to a predetermined threshold value is to reveal, without interpretation of a result of step H by a non-destructive testing specialist, a compromise of the portion of structure.

According to one embodiment of the first aspect of the invention, a period between sending the first measurement request and sending the second measurement request is predetermined.

One advantage of the predetermined period is that the entire monitoring method is triggered reproducibly at the initial request of the operator without requiring further interaction by the operator.

According to one embodiment of the first aspect of the invention, the execution time instant of step A is programmed.

One advantage of the programmed time instant is the execution of the entire monitoring method, in a programmed manner, without interaction from an operator, for example to perform a night test.

Programming the execution time instant according to a time instant list allows a continuous autonomous testing mode, without interaction by the operator.

A second aspect of the invention relates to a method of measurement in a portion of a structure implementing an ultrasonic non-destructive testing device configured to be controlled by a control station by means of a remote network, the ultrasonic non-destructive testing device comprising a multi-element ultrasonic sensor disposed on a surface of the portion of the structure, the method comprising the following steps of:
  I) the ultrasonic non-destructive testing device receiving a first measurement request from the control station;
  J) the multi-element ultrasonic sensor measuring a first plurality of measurement data;
  K) the ultrasonic non-destructive testing device sending the first plurality of measurement data to the control station;
  L) subsequently to receiving the first measurement request, the ultrasonic non-destructive testing device receiving a second measurement request from the control station;
  M) the multi-element ultrasonic sensor measuring a second plurality of measurement data;
  N) the ultrasonic non-destructive testing device sending the second plurality of measurement data to the control station.

According to one embodiment of the second aspect of the invention, the remote network is wireless.

According to one embodiment of the second aspect of the invention, the first measurement request includes at least one first information selecting a measurement mode.

According to one embodiment of the second aspect of the invention, the first measurement request includes at least one first operating parameter of the measurement mode.

According to one embodiment of the second aspect of the invention, the second measurement request includes at least one second information selecting the measurement mode.

According to one embodiment of the second aspect of the invention, the second measurement request includes at least one second operating parameter of the measurement mode.

According to one embodiment of the second aspect of the invention, the measuring steps J and M comprise the following sub-steps of:
  for each ultrasonic element of the multi-element ultrasonic sensor:
  U) the ultrasonic element of the multi-element ultrasonic sensor generating an incident ultrasonic wave propagating in the portion of the structure;
  V) all the ultrasonic elements of the multi-element ultrasonic sensor measuring a plurality of measurement data, the plurality of measurement data corresponding to the reception of an ultrasonic wave reflected on each ultrasonic element of the multi-element ultrasonic sensor.

The measurement mode performed by steps U and V successively for each ultrasonic element is a so-called full matrix capture measurement mode. The full matrix capture mode provides the data to construct a more extensive mapping than a standard measurement mode (for example, sector scan), with optimal spatial resolution and focus at any point.

A third aspect of the invention relates to a control station configured to perform the steps of the method according to the first aspect of the invention.

A fourth aspect of the invention relates to an ultrasonic non-destructive testing device comprising a multi-element ultrasonic sensor and configured to perform the steps of the method according to the second aspect of the invention.

A fifth aspect of the invention relates to a system comprising a control station according to the third aspect of the invention and at least one ultrasonic non-destructive testing device according to the fourth aspect of the invention.

Defects such as fatigue cracks, created by pressure variations in the equipment, can propagate rapidly. The progress can be accelerated in the presence of hydrogen by the "Hydrogen Enhanced Fatigue" phenomenon. The invention according to the sixth aspect of the invention provides a solution by making it possible to monitor the change in a fatigue defect in a pressurised equipment.

To this end, a sixth aspect of the invention relates to the use of a system according to the fifth aspect of the invention, in which the multi-element ultrasonic sensor is disposed on a surface of a portion of a pressurised boiler equipment, such as an adsorber.

The system according to the sixth aspect of the invention especially makes it possible to monitor the change in defects during a pressure variation in order to determine impact of a loading variation on the propagation of the crack. The system also allows the degree of hydrogen fatigue of the crack to be monitored by repeated mappings over time.

The invention and its various applications will be better understood upon reading the following description and examining the accompanying figures.

BRIEF DESCRIPTION OF THE FIGURES

The figures are set forth as indicating and in no way limiting purposes of the invention.

DETAILED DESCRIPTION

Unless otherwise specified, a same element appearing in different figures has a single reference.

Figure 1:
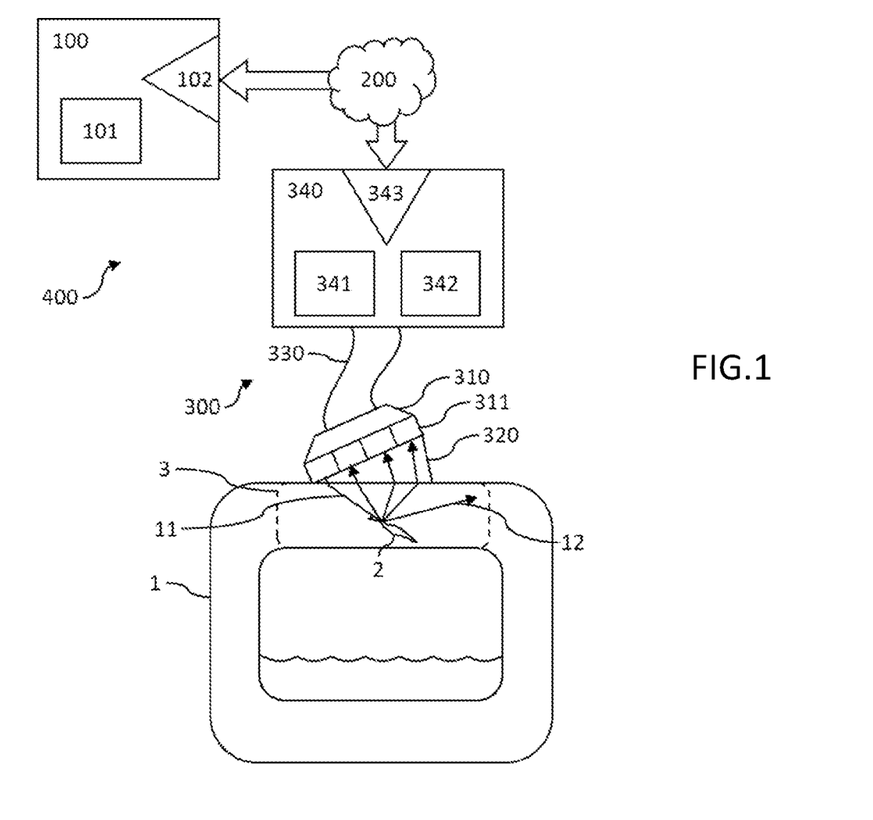
FIG. 1 shows a schematic representation of the system according to the invention.

FIG. 1 sets forth a testing system 400 for testing the change in a portion 3 of a structure 1, for monitoring appearance or change in a defect 2 in the portion 3. The system 400 includes a control station 100 and an ultrasonic non-destructive testing device 300, the ultrasonic non-destructive testing device 300 including a multi-element ultrasonic sensor 310.

When the presence of the defect 2 has been identified in the portion 3 by a preliminary inspection step, the ultrasonic non-destructive testing device 300 is deployed in the vicinity of the structure 1 and the multi-element ultrasonic sensor 310 is disposed in contact with a surface of the portion 3.

According to one embodiment, the structure 1 may be a pressurised boiler equipment, such as an adsorber.

The connection between the control station 100 and the ultrasonic non-destructive testing device 300 is made through a remote network 200. The remote network 200 allows the transfer of data such as a command or measurement data. The remote network 200 may be wired, for example by means of an electronic cable, or wireless, for example implementing a Wi-Fi or 4G communication means, or can be a combination of all these means.

By virtue of the implementation of the remote network 200, the control station 100 may be remote from the ultrasonic non-destructive testing device 300 and thus from the portion 3 including the defect 2. Thus, regardless of the level of compromise of the structure 1, an operator interacting with the control station 100 can initiate a testing method from a safe environment.

The testing system 400 may include another ultrasonic non-destructive testing device 300, deployed at the same structure 1 or another structure 1 in order to test another portion 3 including another defect 2. The connection between the control station 100 and the other ultrasonic non-destructive testing device 300 is made through the remote network 200. The testing method may be executed between the control station 100 and each ultrasonic non-destructive testing device 300 simultaneously, without interactions.

The two structures 1 may be located at geographically remote testing sites, for example several hundred kilometres apart. By virtue of the implementation of the remote network 200, the control station can be shared among different sites and, for example, located in a testing room. Thus, the operator does not need to physically go to each control site to perform the test of the structure.

The ultrasonic non-destructive testing device 300 is configured to perform, in the portion 3 of the structure 1, the steps of an ultrasonic measurement method detailed below. To this end, the ultrasonic non-destructive testing device 300 comprises:
the multi-element ultrasonic sensor 310; and
a multi-element electronic board 340.

The multi-element ultrasonic sensor 310 comprises a plurality of ultrasonic elements 311. An ultrasonic element 311 is a translator (also referred to as a transducer) for converting an electrical signal into an acoustic wave and converting an acoustic wave into an electrical signal. The number of ultrasonic elements 311 included in the multi-element ultrasonic sensor 310 may reach a few hundred elements typically ranging from 8 to 256 elements.

The ultrasonic elements 311 are made of a material for generating an incident acoustic wave 11 with a frequency in the ultrasonic range, preferably in a range of 0.2 MHz to 20 MHz. The ultrasonic elements 311 may, for example, be made of a piezoelectric ceramic, such as for example Lead Zirconate Titanate (PZT).

The plurality of ultrasonic elements 311 are used to generate a plurality of incident ultrasonic waves 11 from a plurality of electrical drive signals, each electrical drive signal actuating an ultrasonic element 311.

Similarly, the plurality of ultrasonic elements 311 are used to produce a plurality of electrical measurement signals, each electrical measurement signal corresponding to an amplitude of a reflected wave 12 received by an ultrasonic element 311.

The plurality of ultrasonic elements 311 may be disposed in a linear arrangement, preferably at a constant pitch. Thus, when the multi-element ultrasonic sensor 310 receives the reflected ultrasonic wave 12, the plurality of electrical measurement signals produced correspond to the spatial discretisation of the reflected ultrasonic wave 12 by the plurality of ultrasonic elements 311.

In order to ensure good mechanical contact between the multi-element ultrasonic sensor 310 and the surface of the portion 3 as well as reproducibility of the measurements, the multi-element ultrasonic sensor 310 may be attached to the surface of the portion 3 by means of an attachment system. This attachment system includes, for example, magnetised studs, glue or suction cups.

The mechanical contact between the multi-element ultrasonic sensor 310 and the surface of the structure 1 is improved by means of a couplant. The couplant ensures a good acoustic impedance match between the multi-element ultrasonic transducer 310 and the propagation material and allows the ultrasonic waves to propagate without attenuation. The couplant may be a liquid such as water, a gel or a grease such as, for example, the high temperature grease EKOGREASE-HT™ manufactured by the EKOSCAN™ company.

In order to facilitate propagation of the incident ultrasonic waves 11 to the defect 2 of the portion 3, a base plate 320 may be inserted between the multi-element ultrasonic sensor 310 and the surface. The base plate 320 is a solid, angularly shaped part that allows the propagation of the ultrasonic waves. An angle formed by the base plate 320, typically between 45° and 60°, allows the incident ultrasonic wave to be oriented in a direction different from the direction normal to the surface of the structure 1. The base plate 320 may be made of a polymer material such as Rexolite™.

The incident ultrasonic wave 11 emitted by an ultrasonic element 311 is a compressional wave and is longitudinal. By virtue of the base plate 320, it is possible to emit transverse incident ultrasonic waves 11 in the portion 3. The angle formed by the incident ultrasonic wave 11 at an interface between the base plate 320 and the portion 3 breaks the wave into a longitudinal component and a transverse component. By adjusting the angle of the incident wave 11, for example by changing the angle formed by the base plate 320, it is possible to favour one component over the other.

The multi-element electronic board 340 comprises:
a generation module 341;
a converter 342; and
a network interface 343, configured to communicate with the remote network 200; and
a bus for interconnecting the components of the multi-element electronic board 340 to each other.

The plurality of electrical drive and measurement signals are transmitted between the multi-element electronic board 340 and the multi-element ultrasonic sensor 310 via an electrical link 330 such as an electronic cable.

The generation module 341 is configured to produce the plurality of electrical drive signals. Each electrical drive signal actuates one ultrasonic element 311 of the plurality of ultrasonic elements 311 of the multi-element ultrasonic sensor 310.

A single ultrasonic element 311 of the plurality of ultrasonic elements 311 may be actuated from a single electrical drive signal in order to emit a single incident ultrasonic wave 11. This mode of emitting a single incident ultrasonic wave 11 is especially implemented in a so-called full matrix capture measurement mode.

The plurality of incident ultrasonic elements 11 may be actuated in parallel from the plurality of drive signals in order to emit the plurality of incident ultrasonic waves 11. By introducing a plurality of delay times, each electrical drive signal can be delayed. Thus, the plurality of delay times and the resulting constructive or destructive interference between each incident ultrasonic wave 11 form a beam of incident ultrasonic waves 11 oriented along a direction and focusing at a focusing point. By modifying the plurality of delay times, the beam of incident ultrasonic waves 11 can be oriented in another direction or the focusing distance can be modified. This emission mode is especially implemented in a so-called sector scan measurement mode.

The focusing distance is defined as the distance between the multi-element ultrasonic sensor 310 and the focusing point.

By modifying the plurality of delay times, the angle formed by the incident ultrasonic wave 11 at the interface between the base plate 320 and the portion 3 can be modified. Thus, it is possible to favour the longitudinal component or the transverse component.

The emission of the beam of incident ultrasonic waves 11 may also be performed by actuating a subgroup of contiguous ultrasonic elements 311 from the plurality of contiguous ultrasonic elements 311. Thus, by sequentially actuating each subgroup of contiguous ultrasonic elements 311 of the plurality of subgroups of contiguous ultrasonic elements 311, the beam of incident ultrasonic waves 11 can be translated along a direction parallel to the multi-element ultrasonic sensor 310. This emission mode is especially implemented in a so-called line scan measurement mode.

The emission of an incident ultrasonic wave 11 or a beam of incident ultrasonic waves 11 is also called firing.

The converter 342 is configured to convert each received electrical measurement signal as a function of time into a measurement data. The resulting plurality of measurement data represent the plurality of amplitudes of each reflected ultrasonic wave 12 received by each ultrasonic element 311 as a function of time.

In both the sector scan and line scan measurement modes, the converter 342 also performs a time shift operation of each measurement data corresponding to the delay time used to generate the beam of incident ultrasonic waves 11 as well as a summation operation of the plurality of measurement data. The resulting measurement data represents the amplitude of an ultrasonic wave propagating in the same orientation as the beam of incident ultrasonic waves 11 but in the reverse direction.

According to one embodiment, the ultrasonic non-destructive testing device 300 is compatible with safety regulations that may be encountered at the testing site, such as the ATEX regulations, describing rules for using electrical equipment in an explosive atmosphere.

The control station 100 is configured to perform the steps of the method for testing the portion 3 of the structure 1 described below, the testing method being especially intended for testing the change in a defect 2 in the portion 3. To this end, the control station 100 comprises:
a calculator unit 101;
a network interface 102, configured to communicate with the remote network 200; and
a bus for interconnecting the components of the control station 100.

Advantageously, the control station comprises a man-machine interface such as a screen, for displaying information to the operator and input peripherals such as a keyboard and/or a mouse.

The control station 100 may, for example, be a laptop computer or a touch-sensitive tablet.

According to one embodiment, the control station 100 is also configured to trigger an indicator. The indicator may be a notification sent to the operator by means of an electronic communication service or, in case of severe compromise of the portion 3, a visual and/or audible warning, sent, for example, by means of an audible (for example, an alarm) or visual (for example, a special rotating light) warning device.

Figure 2:
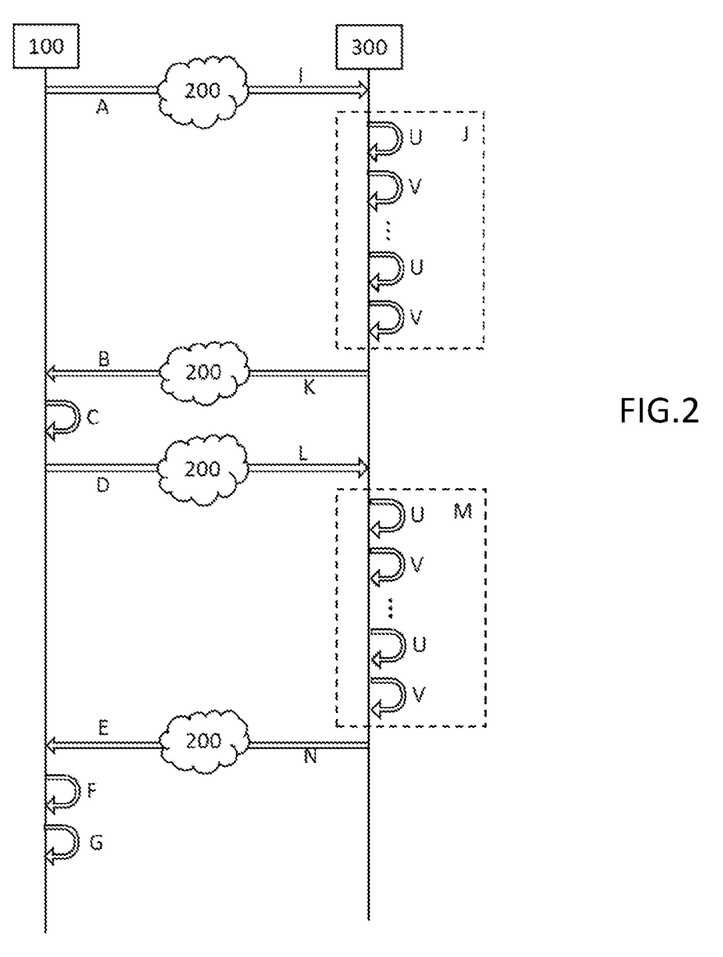
FIG. 2 shows a schematic representation of an ultrasonic testing and measuring method according to the invention.

FIG. 2 schematically sets forth the ultrasonic measurement method in the portion 3 of the structure 1. The method includes steps I, J, K, L, M and N, performed successively.

Step I: Receiving a First Measurement Request

Step I of the measurement method consists in the ultrasonic non-destructive testing device 300 receiving a first measurement request sent by the control station 100.

The first measurement request is a command, understandable by the ultrasonic non-destructive testing device 300. Receiving the first measurement request results in triggering step J.

According to one embodiment, the first measurement request includes a first information for programming the ultrasonic non-destructive testing device 300 and selecting the measurement mode implemented in step J. When sector scan is selected, the first measurement request advantageously includes a plurality of additional information such as a minimum angle, a maximum angle, an angular pitch or a focusing distance. The first information may also allow the type of incident ultrasonic wave 11 propagating in the portion 3 to be selected, favouring the longitudinal or transverse component.

Step J: Obtaining a First Plurality of Measurement Data

Step J consists in obtaining a first plurality of measurement data 500.

Figure 3:
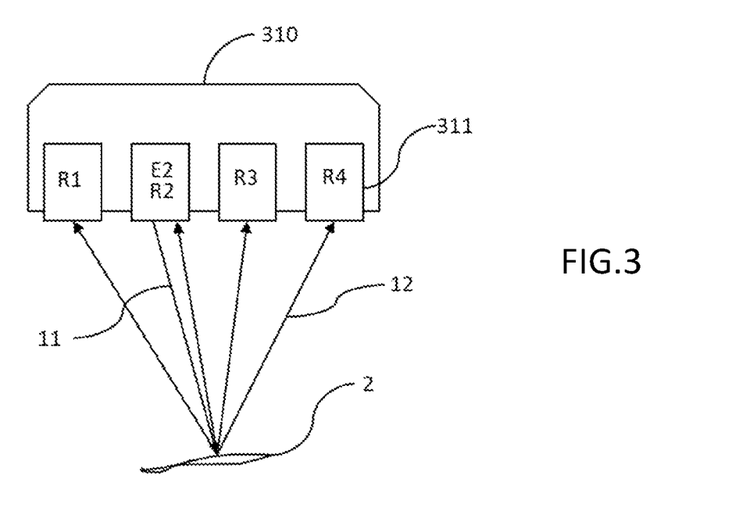
FIG. 3 shows a schematic representation of a multi-element ultrasonic sensor.

The first plurality of measurement data 500 may be obtained by the full matrix capture mode. In FIG. 3, schematically setting forth the full matrix capture mode, the multi-element ultrasonic sensor 310 includes four ultrasonic elements 311. In this example, the role of the second ultrasonic element 311 is to be a transmitter and includes the sign E2 and the role of all ultrasonic elements 311 is to be a receiver and includes the signs R1, R2, R3 and R4. The full matrix capture mode involves two steps, U and V.

In step U, the transmitting ultrasonic element E2 generates the incident ultrasonic wave 11 propagating in the portion 3. In step V, the receiving ultrasonic elements R1, R2, R3, R4 receive the reflected ultrasonic wave 12 from the reflection of the incident ultrasonic wave 11 by the defect 2 and produce the plurality of electrical measurement signals. Steps U and V are repeated sequentially by selecting another ultrasonic element 311 as a transmitter until all transmitting ultrasonic elements E1, E2, E3, E4 have been implemented in step U.

Figure 4:
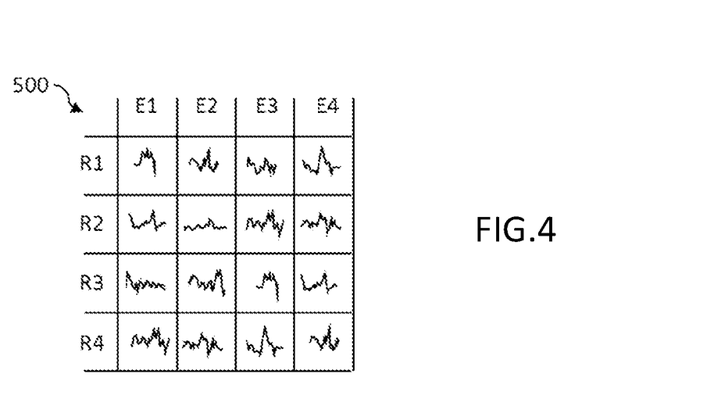
FIG. 4 shows a schematic representation of a plurality of digital measurement data.

The plurality of measurement data 500 may take the form of a matrix, as set forth in FIG. 4. The matrix comprises, in this case, a plurality of rows and a plurality of columns. Each row, denoted as R1, R2, R3, R4, corresponds to one of the receiving ultrasonic elements R1, R2, R3, R4 and each column, denoted as E1, E2, E3, E4, corresponds to one of the transmitting ultrasonic elements E1, E2, E3, E4. For each transmitting ultrasonic element E1, E2, E3, E4, the plurality of measurement data, derived from the conversion of the plurality of electrical measurement signals relating to the transmitting ultrasonic element E1, E2, E3, E4, are stored in the column corresponding to the transmitting ultrasonic element E1, E2, E3, E4.

The first plurality of measurement data 500 may be obtained by sector scan. Data acquisition is performed by scanning the orientation of the beam of incident ultrasonic waves 11 at a plurality of angles, the plurality of angles being defined by the minimum angle, the maximum angle and the angular pitch. The first plurality of measurement data 500 are thus formed by the plurality of measurement data relating to the plurality of angles.

The first plurality of measurement data 500 may also be obtained by a so-called line scan measurement mode. The first plurality of measurement data 500 are thus formed by the plurality of measurement data relating to each subgroup of contiguous ultrasonic elements 311.

Step K: Sending the First Plurality of Measurement Data

Step K consists in the ultrasonic non-destructive testing device 300 sending, by means of the remote network 200, the first plurality of measurement data 500 to the control station 100.

Step L: Receiving a Second Measurement Request

Step L consists in the ultrasonic non-destructive testing device 300 receiving a second measurement request from the control station 100. The second measurement request may take the same form as the first measurement request described above. Receiving the second measurement request results in triggering step M.

According to one embodiment, the second measurement request includes a second information for programming the ultrasonic non-destructive testing device 300 and selecting the measurement mode. The measurement mode implemented in step M may be different from the measurement mode implemented in step J. The second information may also enable the type of incident ultrasonic wave 11 propagating in the portion 3 to be selected.

Step M: Obtaining a Second Plurality of Measurement Data

Step M consists in obtaining a second plurality of measurement data 500.

The measurement mode implemented to obtain the second plurality of measurement data 500 may be defined by the second measurement request and is one of the previously described measurement modes.

Step N: Sending the Second Plurality of Measurement Data

Step N consists in the ultrasonic non-destructive testing device 300 sending, by means of the remote network 200, the second plurality of measurement data to the control station 100.

FIG. 2 schematically sets forth the method of monitoring (also said testing) the portion 3 of the structure 1 described below, the monitoring method being especially intended to monitor the change in the defect 2.

The monitoring method includes steps A, B, C, D, E, F and G, performed successively.

Step A: Sending the First Measurement Request

Step A of the monitoring method consists in the control station 100 sending, by means of the remote network 200, to the ultrasonic non-destructive testing device 300, the first measurement request described in step I of the ultrasonic measurement method.

According to one embodiment, the first measurement request includes the first information for selecting the measurement mode implemented by the ultrasonic non-destructive testing device 300 to obtain the first plurality of measurement data. As a function of preliminary information available to the operator prior to the execution of the monitoring method, the operator may thus select the measurement mode that is most adapted to monitoring the portion 3. Thus, the ultrasonic non-destructive testing device 300 is remotely programmable.

According to one embodiment, the execution of step A is triggered, on demand, by an operator. Step A does not include any measurement preparation or preliminary calculations that could postpone the sending of the first measurement request, thus, when the operator triggers the execution of step A, the first measurement request is sent instantly to the ultrasonic non-destructive testing device 300.

According to one embodiment, the execution time instant of step A is programmable. For example, it may be programmed at a later time instant, for example for a night-time measurement. It may also be programmed according to a time instant list, allowing a continuous autonomous control mode.

Step B: Receiving the First Plurality of Measurement Data

Step B of the monitoring method consists in the control station 100 receiving, by means of the remote network 200, a first plurality of measurement data 500 from the ultrasonic non-destructive testing device 300.

Step C: Construction of a First Mapping

Step C of the monitoring method consists in constructing a first mapping of the portion 3, by means of the calculator unit 101, from the first plurality of measurement data 500.

The first mapping represents the amplitude of the reflected ultrasonic wave 12, proportional to an acoustic impedance variation in a plane of the portion 3. The plane is defined in two dimensions: a depth in the portion 3 and a distance along a direction tangent to the surface of the portion 3, parallel to the plurality of ultrasonic elements 311.

When the first plurality of measurement data 500 is obtained by the so-called full matrix capture measurement mode, the construction of the first mapping follows the steps of a total focusing method algorithm. The steps of the total focusing algorithm are as follows:

The portion 3 is meshed according to parameters, by means of the calculator unit 101, to obtain a plurality of mesh points. The mesh parameters may be the depth of the portion 3, the expected spatial resolution or the number of ultrasonic elements 311 of the multi-element ultrasonic sensor 310.

For each mesh point, a plurality of delay times are calculated, by means of the calculator unit 101. Each delay time is assigned to an ultrasonic element 311 and corresponds to the time required for the incident ultrasonic wave 11 to propagate from the transmitting ultrasonic element E1, E2, E3, E4 to the mesh point.

For each mesh point, each column of the first plurality of measurement data 500 is delayed, by means of the calculator unit 101, according to the delay time assigned to the transmitting ultrasonic element E1, E2, E3, E4.

For each mesh point, each measurement data is summed up by means of the calculator unit 101 to form the first mapping.

When the first plurality of measurement data 500 are obtained by sector scan or line scan, each measurement data is assembled, by means of the calculator unit 101, according to its corresponding angle or distance to form the first mapping.

Step D: Sending the Second Measurement Request

Step D of the monitoring method consists in the control station 100 sending, by means of the remote network 200, the second measurement request to the non-destructive testing device 300.

The second measurement request may take the same form as the first measurement request described above.

According to one embodiment, the second measurement request includes the second information for selecting the measurement mode implemented to obtain the second plurality of measurement data. Thus, the operator may reprogram the ultrasonic non-destructive testing device 300 to change the measurement mode, refine a resolution, or extend the measurement to a larger zone within the portion 3. Thus, the ultrasonic non-destructive testing device 300 is remotely reprogrammable.

A period between sending the first measurement request and sending the second measurement request makes it possible to observe the change over time in a portion 3, indicated by a second mapping, relative to an initial state, indicated by the first mapping.

The period may vary according to a characteristic time of the change in the portion 3 ranging from a few minutes to several days. For example, if the structure 1 is an adsorber and the portion 3 is a portion of a wall of the adsorber, the defect 2 contained in the portion 3 is likely to change during pressure variations, for example during the filling phase. It is therefore conceivable to perform the first mapping at the beginning of the filling phase and the second mapping at the end of the filling phase, so that the period can be equal to the time of the filling phase.

If the defect 2 is likely to change as a function of a slower process, for example by a hydrogen fatigue phenomenon, the period may be several days or several weeks.

According to one embodiment, the period is predetermined. Once the period has elapsed, step E is triggered automatically.

According to one embodiment, the period may be interrupted by an operator triggering step E.

Step E: Receiving the Second Plurality of Measurement Data

Step E of the monitoring method consists in the control station 100 receiving, by means of the remote network 200, a second plurality of measurement data 500 sent by the non-destructive testing device 300.

Step F: Constructing a Second Mapping

Step F of the monitoring method consists in the control station 100 constructing the second mapping of the portion 3, by means of the calculator unit 101, from the second plurality of measurement data 500.

The second mapping is constructed according to the operating mode described above.

In the same way as the first mapping, the second mapping represents the amplitude of the reflected ultrasonic wave 12, proportional to the acoustic impedance variation in the portion 3 as a function of the first and second dimensions.

Step G: Comparing the First and Second Mappings

Step G of the monitoring method consists in the control station 100 comparing, by means of the calculator unit 101, the first mapping and the second mapping.

According to one embodiment, the comparison between the first and second mappings is performed for a same set of coordinates, for example by carrying out a mathematical operation between the magnitude values, such as a difference. A resulting mapping then indicates an acoustic impedance variation between obtaining the first and second pluralities of measurement data 500, for example due to the enlargement of a crack or the appearance of a porous zone.

According to one embodiment, the resulting mapping may be used to automatically trigger the indicator. For example, a value of the depth of the zone having the acoustic impedance variation is displayed as a function of time and allows the progress of the defect to be monitored. Thus, if the depth of the zone having the impedance variation deviates from a predetermined threshold value, then the indicator is triggered.

The automatic triggering of the indicator, relating to a predetermined threshold value, allows a non-expert operator in ultrasonic non-destructive testing to be warned of a level of compromise of one of the tested structures in order to trigger, for example, the necessary maintenance or safety operations.

The invention claimed is:

1. A method for monitoring a portion of a structure implementing a control station configured to control at least one ultrasonic non-destructive testing device through a remote network, each ultrasonic non-destructive testing device comprising a multi-element ultrasonic sensor disposed on a surface of the portion of the structure, the structure being an adsorber and the portion being a wall of the adsorber, the method comprising, for each ultrasonic non-destructive testing device, the following steps of:

A) sending by the control station a first measurement request to the non-destructive testing device, at a beginning of a filling phase of the adsorber;
   B) receiving by the control station a first plurality of measurement data from the non-destructive testing device, the first plurality of measurement data being measured by the multi-element ultrasonic sensor of the ultrasonic non-destructive testing device;
   C) constructing by the control station a first mapping of the portion of the structure from the first plurality of measurement data;
   D) subsequently to sending the first measurement request, sending by the control station a second measurement request to the non-destructive testing device, at an end of the filling phase of the adsorber;
   E) receiving by the control station a second plurality of measurement data from the non-destructive testing device, the second plurality of measurement data being measured by the multi-element ultrasonic sensor of the ultrasonic non-destructive testing device;
   F) constructing by the control station a second mapping of the portion of the structure, from the second plurality of measurement data; and G) comparing by the control station the first mapping and the second mapping.

2. The method according to claim 1, wherein the remote network is wireless.

3. The method according to claim 1, wherein the first measurement request includes at least one first information selecting a measurement mode.

4. The method according to claim 3, wherein the first measurement request includes at least one first operating parameter of the measurement mode.

5. The method according to claim 1, wherein the second measurement request includes at least one second information selecting the measurement mode.

6. The method according to claim 5, wherein the second measurement request includes at least one second operating parameter of the measurement mode.

7. The method according to claim 1, wherein when at least one parameter representative of the comparison between the first mapping and the second mapping deviates from a threshold value, the method includes a step of triggering an indicator.

8. A control station configured to perform the steps of the method according to claim 1.

9. A testing system comprising a control station according to claim 8 and at least one ultrasonic non-destructive testing device.

10. A method comprising providing a testing system according to claim 9, wherein the multi-element ultrasonic sensor is disposed on a surface of a portion of a pressurised boiler equipment, the pressurised boiler equipment being an adsorber.

11. A method of measurement in a portion of a structure implementing an ultrasonic non-destructive testing device configured to be controlled by a control station through a remote network, the ultrasonic non-destructive testing device comprising a multi-element ultrasonic sensor disposed on a surface of the portion of the structure, the structure being an adsorber and the portion being a wall of the adsorber, the method comprising the following steps of:

I) receiving by the ultrasonic non-destructive testing device a first measurement request from the control station, at a beginning of a filling phase of the adsorber;

J) measuring by the multi-element ultrasonic sensor a first plurality of measurement data;

K) sending by the ultrasonic non-destructive testing device the first plurality of measurement data to the control station;

L) subsequently to receiving the first measurement request, receiving by the ultrasonic non-destructive testing device a second measurement request from the control station, at an end of the filling phase of the adsorber;

M) measuring by the multi-element ultrasonic sensor a second plurality of measurement data;

N) sending by the ultrasonic non-destructive testing device the second plurality of measurement data to the control station.

12. The measuring method according to claim 11, wherein the measuring steps J and M comprise the following sub-steps of:

for each ultrasonic element of the multi-element ultrasonic sensor:

U) generating by the ultrasonic element of the multi-element ultrasonic sensor an incident ultrasonic wave propagating in the portion of the structure;

V) measuring by all the ultrasonic elements of the multi-element ultrasonic sensor a plurality of measurement data, the plurality of measurement data corresponding to the reception of a reflected ultrasonic wave on each ultrasonic element of the multi-element ultrasonic sensor.

13. An ultrasonic non-destructive testing device comprising a multi-element ultrasonic sensor and configured to perform the steps of the method according to claim 11.

14. A testing system comprising a control station and at least one ultrasonic non-destructive testing device according to claim 13.

15. A method comprising providing a testing system according to claim 14, wherein the multi-element ultrasonic sensor is disposed on a surface of a portion of a pressurised boiler equipment, the pressurised boiler equipment being an adsorber.

* * * * *